United States Patent [19]
Granning

[11] 3,713,663
[45] Jan. 30, 1973

[54] VEHICLE SUSPENSION

[75] Inventor: Ole Granning, Detroit, Mich.

[73] Assignee: Granning Suspensions Inc., Dearborn, Mich.

[22] Filed: Jan. 28, 1971

[21] Appl. No.: 110,420

[52] U.S. Cl. .............................280/112 R, 267/15 A
[51] Int. Cl. ................................................B60j 11/26
[58] Field of Search ...280/112, 112 A, 124 R, 124 F; 267/15, 15 A, 20 C

[56] References Cited

UNITED STATES PATENTS

| | | | |
|---|---|---|---|
| 3,133,745 | 5/1964 | Granning | 280/112 |
| 2,913,252 | 11/1959 | Norrie | 267/15 A X |
| 3,332,701 | 7/1967 | Masser | 267/15 A X |

*Primary Examiner*—Philip Goodman
*Attorney*—Whittemore, Hulbert & Belknap

[57] ABSTRACT

The vehicle suspension provides an axle assembly which may be mounted either on a truck-tractor or a truck trailer. The suspension includes an axle which is suspended from the vehicle frame by means of a pair of springs. An integral drawbar and guide member is secured to the axle. The integral member includes a drawbar portion which extends forwardly for resilient securement to vehicle structure. A guide portion extends in the opposite direction for sliding engagement with vertical guide means. The integral member includes a central portion having transverse recess means on the underside which is received on the axle to orient the integral member with respect to the axle and provide means for welding the integral member to the axle. The welding is on diametrically opposite sides of the recess but not on the top thereof to leave the top portion of the axle free from restraint to permit stress relief.

6 Claims, 7 Drawing Figures

PATENTED JAN 30 1973
3,713,663
SHEET 1 OF 2
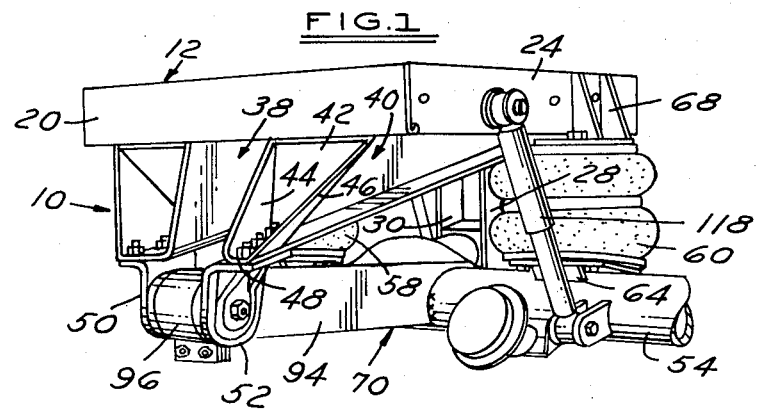
FIG.1
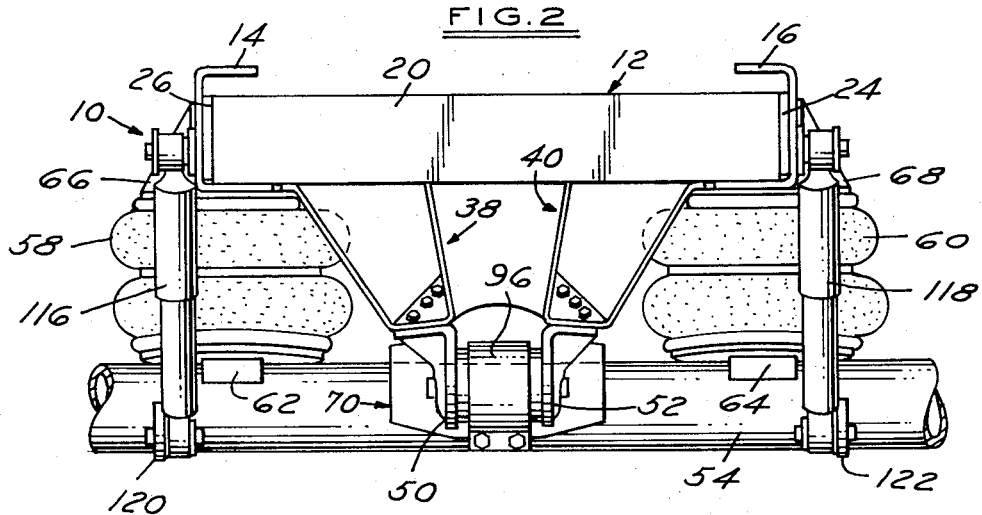
FIG.2
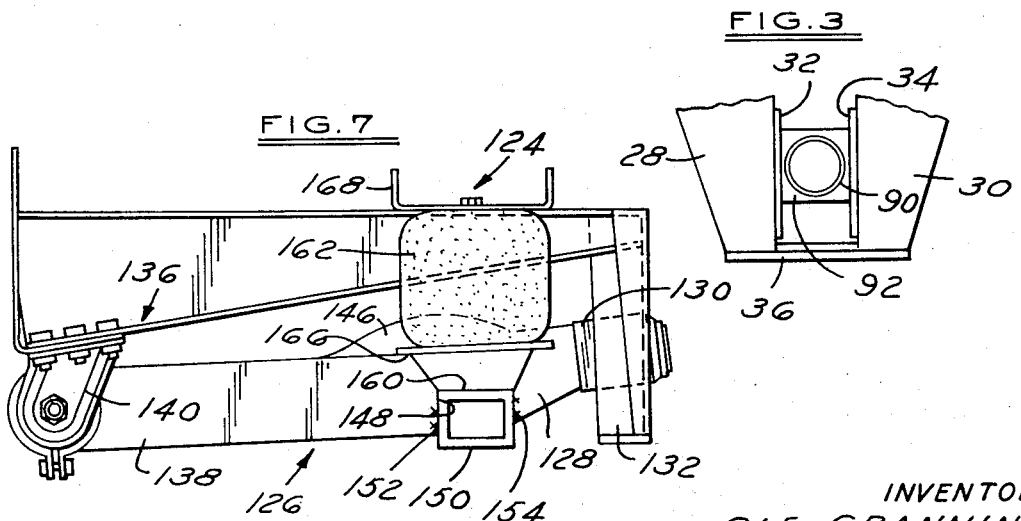
FIG.7
FIG.3
INVENTOR
OLE GRANNING
BY Whittemore,
Hulbert & Belknap
ATTORNEYS

INVENTOR
OLE GRANNING

ATTORNEYS 3,713,663

VEHICLE SUSPENSION

BACKGROUND OF THE INVENTION

In my U.S. Pat. No. 3,133,745, issued May 19, 1964, and my co-pending patent application, Ser. No. 45,613, filed June 12, 1970, I have disclosed a suspension for tractors and trailers. The present invention constitutes an improvement over my prior structures.

My axle assemblies may be added to a vehicle as an additional axle to increase the load-carrying capacity of the vehicle or they may be provided as an original axle on a truck-tractor or trailer.

My present invention provides an axle assembly which is economical to manufacture and which provides desired alignment of the various components automatically. I have provided a combined integral drawbar and guide member assembly for direct attachment to the axle. The assembly includes a drawbar portion which extends forwardly from the axle and a guide portion which extends rearwardly from the axle. These portions are interconnected by a central portion having transverse recess means on the underside thereof. The recess means have a configuration which mates with at least a portion of the periphery of the axle which is received therein.

The present invention possesses the advantages set forth in my co-pending patent application above-identified. Additionally, the integral drawbar and guide member results in self-aligning of the unit to all axle configurations. This is accomplished automatically as a result of the configuration of the integral member. It is merely necessary to set the axle in the recess means of the integral member and then weld the axle and integral member together. Complicated fixturing and alignment devices are not necessary. The integral member is economically fabricated either by casting or forging. The resultant structure has high strength characteristics not obtainable with separate drawbar and guide members individually secured to the axle as has been the practice in the past.

Another desirable feature of the construction is that in the process of welding the integral member to the axle, it is only necessary to provide a weldment on diametrically opposed sides of the axle, leaving the top of the axle free from restraint. This is advantageous in permitting stress relief on the upper portion of the axle during use of the device.

SUMMARY OF THE INVENTION

The suspension sub-assembly for a vehicle comprises a sub-assembly support structure which is separate from the vehicle frame. The sub-assembly support structure is of a size and includes structure for mounting thereof on the vehicle frame. A spring structure is securable between the vehicle frame and the sub-assembly support structure. An axle is suspended from the spring structure. An integral drawbar and guide member is secured to the axle. The integral member includes a drawbar portion extending outwardly from the axle towards the forward end of the sub-assembly support structure. A second depending axle support structure is provided at the forward end of the sub-assembly. Resilient fastening means, pivotal about an axis transverse to the longitudinal axis of the drawbar and generally parallel to the axis of the axle, secure the drawbar to the second support structure. Vertical guide means comprising downwardly depending means defining guide surface structure for securement to the vehicle frame are provided. The integral member includes a guide portion having vertically slidable structure. The guide portion extends outwardly from the axle for sliding engagement of the vertical slidable structure with the guide surface structure. The integral member includes a central portion having transverse recess means on the underside thereof. The recess means have a configuration mating with at least a portion of the periphery of the axle. The axle is received in the recess means. The recess means are oriented with respect to the drawbar portion and guide portion and the drawbar portion and guide portion are oriented with respect to each other in a fashion to achieve a desired orientation of the drawbar portion and guide portion with respect to the axle. The integral member is welded to the axle. A weldment is provided on opposite sides of the axle adjacent the mouth of the recess. The weldments do not extend entirely around the axle, thus leaving an unrestrained portion of the axle at the top thereof free for flexing to permit stress relief of the axle during use thereof.

IN THE DRAWINGS:

FIG. 1 is a view in perspective of one embodiment of the vehicle suspension of the present invention;

FIG. 2 is a front elevational view of the vehicle suspension of FIG. 1 illustratively mounted on a vehicle frame;

FIG. 3 is a rear elevational view of guide structure for the vehicle suspension;

FIG. 7 is a side elevational view of another embodiment of the invention in which a different spring structure is utilized.

Figure 4:
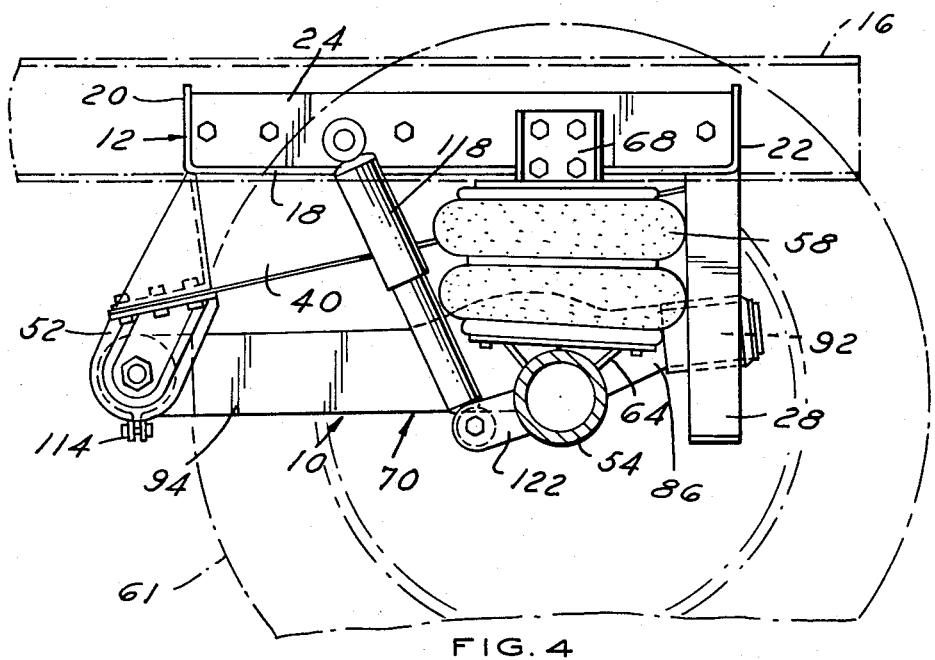
FIG. 4 is a side elevational view of the vehicle suspension of FIG. 1 with a vehicle frame and whell assembly illustrated in phantom lines.
Figure 5:
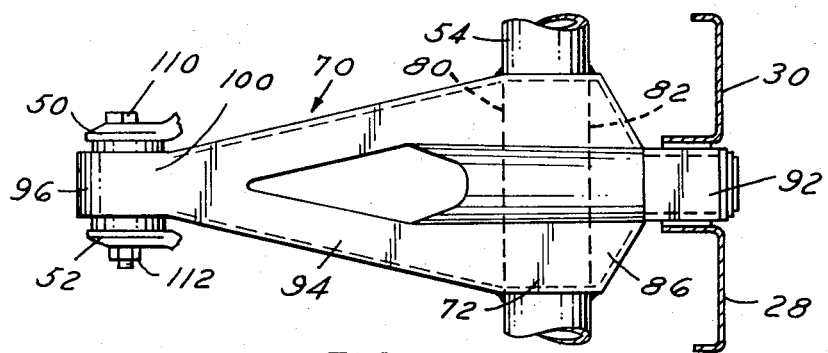
FIG. 5 is a top plan view of the combination drawbar and guide spindle member illustrating the weldment thereof to the vehicle axle.
Figure 6:
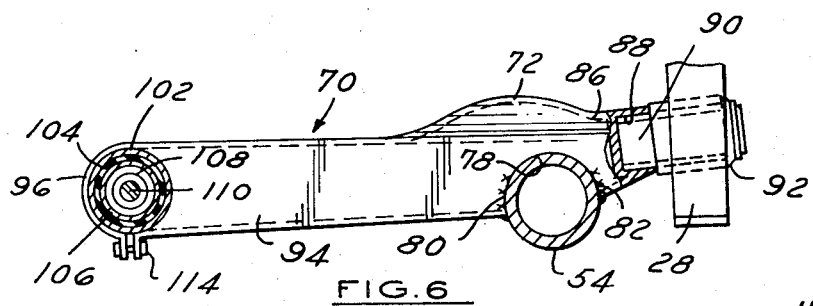
FIG. 6 is a side elevational view of the combination drawbar and guide spindle also illustrating the weldment thereof to the vehicle axle.

Referring to the embodiment illustrated in FIGS. 1–6, it will be noted that the vehicle suspension 10 includes a generally rectangular axle frame 12 which is adapted for mounting on a pair of spaced apart vehicle frame channel members 14, 16. The frame 12 comprises a lower plate member forming a bottom wall 18, the ends of the plate member being bent upwardly to form end walls 20, 22. An angle member 24, 26 extends between the end walls and is welded to the plate structure to complete the box-like frame structure.

A pair of channel legs 28, 30 extend downwardly from the rear of the frame 12. The legs are spaced apart to form a guide opening. Bearing plates 32, 34 are provided on the inner faces of the lower portion of the legs. The legs are joined together at their lower ends by a plate 36. The upper ends of the legs are secured to the frame 12 as by welding.

A pair of longitudinally extending, spaced apart support structures 38, 40 are provided on the underside of the frame 12. These support structures extend from the forward portion and terminate at the legs 28, 30. The support structures 38, 40 extend downwardly at the forward end of the suspension and are angled upwardly therefrom towards the rearward end to thus form a generally triangularly shaped configuration as viewed from the side as in FIG. 4. The rearward portion of the support structure is generally L-shaped in cross-section. The forward portion of the support structures is enlarged and of a generally box-like configuration, each comprising a back wall 42, side walls 44, 46 and bottom wall 48. Angle-shaped coupling structures 50, 52 are bolted to the underside of the bottom walls.

An axle 54, which supports a pair of rotatable wheels 61, indicated in dotted lines in FIG. 4, is supported by and guided between the front and rear leg structures of the axle frame 12 and is suspended from the vehicle frame channel members 14, 16 by a pair of pneumatic springs 58, 60 located adjacent each end of the axle. The springs 58, 60 are of conventional structure and each comprises a pair of flexible air bags. The air bags have upper and lower metallic reinforcing discs vulcanized thereto and a center disc vulcanized to the bags to join them together. A conventional pneumatic circuit (not shown) is associated with each spring to supply the bags with the desired amount of air under pressure to maintain the bags at the proper air pressure. In operation, an upward force on the bags will cause air to be expelled from the bags, permitting collapse thereof to accommodate upward movement of the axle. The control system associated with the bags will subsequently cause the air pressure within the bags to increase thus forcing the axle back downwardly to its normal position.

The springs 58, 60 are secured to the axle by brackets 62, 64 which are secured to the lower discs of the spring assemblies by means of bolts. Extending downwardly from each bracket and spaced projections which are welded to the axle 54 to thus secure the axle to the springs. The springs are secured to the frame channel members 14, 16 by means of brackets 66, 68. The brackets are angle-shaped, having one leg extending upwardly and secured to the exterior of the adjacent frame channel member by means of bolts. The horizontal member of each bracket is secured to the upper disc of the spring assembly, also by means of bolts.

A combination drawbar and guide spindle member 70 is secured to the axle 54. The member 70 is a unitized structure, having an upwardly curved central portion 72 which extends over the axle 54 and has a substantially semicircular transverse recess 78 in the lower surface thereof which is received on the axle and welded thereto. As will be noted in FIGS. 5 and 6, the weldments are at 80, 82, extending from the outer edges of the recess for a relatively short distance around the periphery of the axle. There is thus an unsecured portion of the axle top surface between the weldments. It has been found that this construction results in desired stress relief of the axle to the top which is the tension side. This permits flexing of the axle during use without damage to the assembly which might occur if the stress relief area were not provided. It will be noted in FIG. 5 that the weldments are continuous over the width of the member 70. This results in a secured, strong structure of which nevertheless provides for stress relief.

The rearwardly extending portion 86, which is the guide portion, of the member 70 has a has a cylindrical opening 88 in the outer end thereof which receives a cylindrical member 90. The member 90 is secured thereto as by welding. The member 90 is the only portion of the member 70 which is not formed integrally therewith. This is a matter of convenience because the shape of the member 90 does not lend itself readily to the casting technique which has been used. However, the member 90 may be formed integrally is another method of fabricating the member 70 is utilized as, for example, forging. The opening 88 which receives the member 90 is, however, formed integrally along with the fabrication of the member 70 and thus orientation of the opening 88 is accurately controlled. The rearward portion 86, which as will be noted is generally triangularly shaped for greater strength, functions as a guide spindle. The member 90 rotatably extends into a rectangular guide block 92 which is mounted for vertical sliding travel in the opening between the legs 28, 30. The spindle portion 86 permits vertical movement of the axle under the constraint of the springs 58, 60 and also permits tilting of the axle about a horizontal axis defined by the longitudinal axis of the spindle portion. The spindle portion maintains the axle in alignment by preventing lateral movement of the axle or pivoting of the axle about a vertical axis. The guide structure may be reversed from that shown. That is, the block may be mounted on a pivotal element which is rigidly affixed to the frame 12, with the guide legs being secured to the member 86. Alternately, instead of a center guide opening for the block to move in, the block may be replaced by a pivotally mounted spaced apart arm structure which would be guided on bearing pads provided on a vertical, rigid structure also attached to the frame 12.

The forward portion of the member 70 defines a drawbar portion 94. The drawbar portion 94 couples the axle to the vehicle frame. As will be noted, the drawbar portion 94 is also generally triangular for greater strength. The center section of the drawbar portion is removed to thereby define a pair of converging legs which terminate in forwardly extending portion 100. As will be noted, the portion 100 terminates in a hollow cylindrical split-ring structure 96. This structure is received between the coupling elements 50, 52. The longitudinal axis of the structure 96 extends transversely of the longitudinal axis of the drawbar portion 94 and generally parallel to the longitudinal axis of the axle 54. A bushing 102 is received in the structure 96. A resilient sleeve 104 is received within the bushing 102. A metallic bushing 106 is received within the sleeve 104. The coupling members 50, 52 have inwardly directed cylindrical portions 108 which are received within the bushing 106. A bolt 110 extends through the portions 108. A nut 112 is provided on the end of the bolt. The split ring construction is secured together by means of a nut and bolt structure 114. This, together with tightening of the nut and bolt structure 110, 112, causes pressure engagement of the resilient sleeve 104 and the adjacent bushings. The pressure applied is sufficient to cause frictional engagement of the various members and prevents relative rotation thereof.

In operation, the resilient sleeve 104 flexes to permit the outer end of the drawbar portion 94 to pivot about a transverse axis a slight degree on the rise or fall of the axle. The sleeve 104 also permits a slight amount of tilting about the longitudinal axis, thus accommodating axle pivoting about a horizontal axis defined by the drawbar and spindle portions. Whenever the axle is moved out of its normal position, the sleeve 104 urges it back towards the normal position and will reposition the axle upon cessation of the force thereon. However, the sleeve 104 does not result in the device tending to strongly seek a center position as has been the case with previous drawbar devices wherein a resilient connection having a center of rotation about an axis parallel to the drawbar axis has been utilized. Such a resilient connection has tended to cause centering of the axle when it is undesired as, for example, when the brakes are applied and a wheel is located in a depression in the roadway. At that time, it is not desired that the axle be centered. However, the previous type of resilient connection has tended to cause such centering when the brakes were applied.

The assembly is completed by a pair of shock absorbers 116, 118 which extend between the vehicle frame and projections 120, 122 welded to the axle 54.

A modified version of the suspension is illustrated in FIG. 7. The suspension 124 there shown includes most of the basic elements previously described. The suspension 124 includes a combination drawbar and guide spindle member 126 having the aforedescribed rearwardly extending guide spindle portion 128 rotatably received in guide block 130. The member 126 also includes the forwardly extending drawbar portion 138 which is resiliently secured at its forward end to a flexible coupling by coupling members 140 as previously described. The coupling members 140 are bolted to the forward end of longitudinally extending support structure 136. Depending guide legs 132 are provided at the other end of the support structure 136 to slidingly receive the block 130 in the manner previously described.

The member 126 is provided with a central curved portion 146 for strength purposes. A rectangular recess 148 is provided beneath the portion 146 to receive a rectangular axle 150. Such rectangular axles are sometimes used and the suspension of the present invention is readily adaptable to such axle configurations or other axle configurations as desired. It will be noted that a short weldment 152, 154 is provided on each of the vertical surfaces of axle 150, leaving the top surface 160 free from fastening to provide the desired stress relief as previously described.

The axle 150 is resiliently supported from a vehicle frame by means of a pair of elastomeric springs, 162. The springs 162 are generally oval in cross-section in the unloaded condition as illustrated in FIG. 7. When a load is applied, the springs deform laterally and assume a somewhat doughnut shape under full load conditions. These springs are desirable from the cost standpoint and result in long maintenance-free life. Auxilliary shock absorbers may be eliminated. The springs result in built-in damping. The springs are fabricated from a rubber-like elastomeric material.

The springs are each provided with a metallic plate bedded into each end thereof. The lower plate is bolted to a bracket 166 which in turn is secured to the upper surface of the axle 150 as by welding. The upper spring plate is bolted to a channel-shaped cross member 168 which extends transversely across the support structure 136. The cross member 168 is secured to the support structure 136 as by welding. The structure thus described may be supported from a vehicle frame by means of an auxilliary frame structure (not shown) similar to that shown and described in connection with the previous embodiment.

From the description which has heretofore been set forth, it will be appreciated that both embodiments of the vehicle suspension have several advantageous characteristics. Firstly, by making the drawbar portion and guide spindle portion integral, these portions will be accurately aligned with respect to each other when mounted on an axle. This is opposed to the prior art technique of providing the drawbar portion and guide spindle portion as separate units individually secured to an axle. As a corollary to the proper orientation of the drawbar portion and guide spindle portion with respect to each other, the provision of a properly oriented recess in the combined member which mates with the configuration of the axle as, for example, the semi-circular recess 78 in the FIGS. 1-6 embodiment and the rectangular recess 148 in the FIG. 7 embodiment, assures that these portions will be properly oriented with respect to the axle. This orientation is automatic upon setting of the combined member on the axle prior to welding. In the case of an axle such as the circular axle 54, it does not matter what angular position the axle assumes prior to welding of the combined member thereto. In the case of an axle such as the rectangular axle 150, the axle must be oriented in a direction to properly receive the recess. Regardless of the configuration of the cross-section of the axle, there will always be automatic alignment of the two members as long as the recess provided in the combined member mates with at least a portion of the configuration of the axle so as to be properly oriented when seated.

The combined member possesses the additional advantage of ease of installation with reduced fabrication expense as compared to a two-part drawbar and guide spindle assembly. In practice, it is convenient to lay the combined member on a support surface with the recess facing upwardly. The axle is then laid into the recess and the welding operation is conveniently performed from the upper side. Another advantage of the combined member is that it results in a high strength unit which, although welded to the axle, permits leaving the upper surface portion of the axle free from welding for stress relief during use of the assembly.

What I claim as my invention is:

1. In a suspension sub-assembly for a vehicle comprising a sub-assembly support structure separate from the vehicle frame and mountable thereon, a spring structure on the sub-assembly support structure securable to the vehicle frame, an axle suspended from said spring structure, an integral drawbar and guide member secured to the axle, said integral drawbar and guide member including a central portion having transverse recess means on the underside thereof, said recess means meeting with at least a portion of the periphery of the axle and being received thereon, said integral drawbar and guide member being welded to the axle in the area of said recess means, said integral member including a drawbar portion extending outwardly from the axle towards the forward end of the sub-assembly support structure, a second depending axle support structure at the forward end of the subassembly, resilient fastening means pivotable about an axis transverse to the longitudinal axis of the drawbar portion and generally parallel to the axis of the axle securing the drawbar to the second support structure, and vertical guide means comprising downwardly depending means defining guide surface structure for securement to the vehicle frame, said integral member including a guide portion having vertically slidable structure, said guide portion extending outwardly from the axle for sliding engagement of said vertical slidable structure with the guide surface structure.

2. A suspension sub-assembly as defined in claim 1, further characterized in that said recess means is oriented with respect to the drawbar portion and guide portion and the drawbar portion and guide portion are oriented with respect to each other in a fashion to achieve a desired orientation of the drawbar portion and guide portion with respect to the axle.

3. A suspension sub-assembly as defined in claim 1, further characterized in that said integral member is received on the upper side of the axle, said welding comprising a weldment on opposite sides of the axle, said weldments terminating short of the upper surface of the axle whereby the upper surface of the axle is unrestrained and free to flex to relieve stress thereon.

4. A suspension sub-assembly as defined in claim 1, further characterized in that the central portion of said integral member is raised with respect to the drawbar portion and guide portion to reinforce the integral member over the axle.

5. A sub-assembly for a vehicle suspension sub-assembly comprising an axle, an integral drawbar and guide member secured to the axle, said integral member including a central portion having transverse recess means on the underside thereof, said integral member being secured to the upper side of the axle with the axle received in the recess means, said recess means having a configuration mating with at least a portion of the periphery of the axle, said recess means being oriented with respect to the drawbar portion and guide portion and the drawbar portion and guide portion being oriented with respect to each other in a fashion to achieve a desired orientation of the drawbar portion and the guide portion with respect to the axle, said integral member being secured to the axle by means of welding, said welding comprising a weldment on opposite sides of the axle, said weldments terminating short of the upper surface of the axle whereby the upper surface of the axle is unrestrained and free to flex to relieve stress thereon, said integral member including a drawbar portion extending outwardly of the axle for ultimate extension forwardly of a vehicle and attachment of a vehicle, and said integral member including a guide portion extending in the opposite direction from the drawbar portion, said guide portion having vertically slidable structure for sliding engagement with a vertical guide means.

6. The combination described in claim 5, further characterized in that the central portion of said integral member is raised with respect to the drawbar portion and guide portion to reinforce the integral member over the axle.

* * * * *